3 Sheets—Sheet 1.

J. PINE.

MOWING-MACHINE.

No. 7,344. Reissued Oct. 10, 1876.

WITNESSES

Robert Everett

Geo. E. Upham

INVENTOR

James Pine

Chipman & Power & Co

Attorneys

JAMES R. OSGOOD & CO. BOSTON.

3 Sheets—Sheet 2.
J. PINE.
MOWING-MACHINE.
No. 7,344. Reissued Oct. 10, 1876.
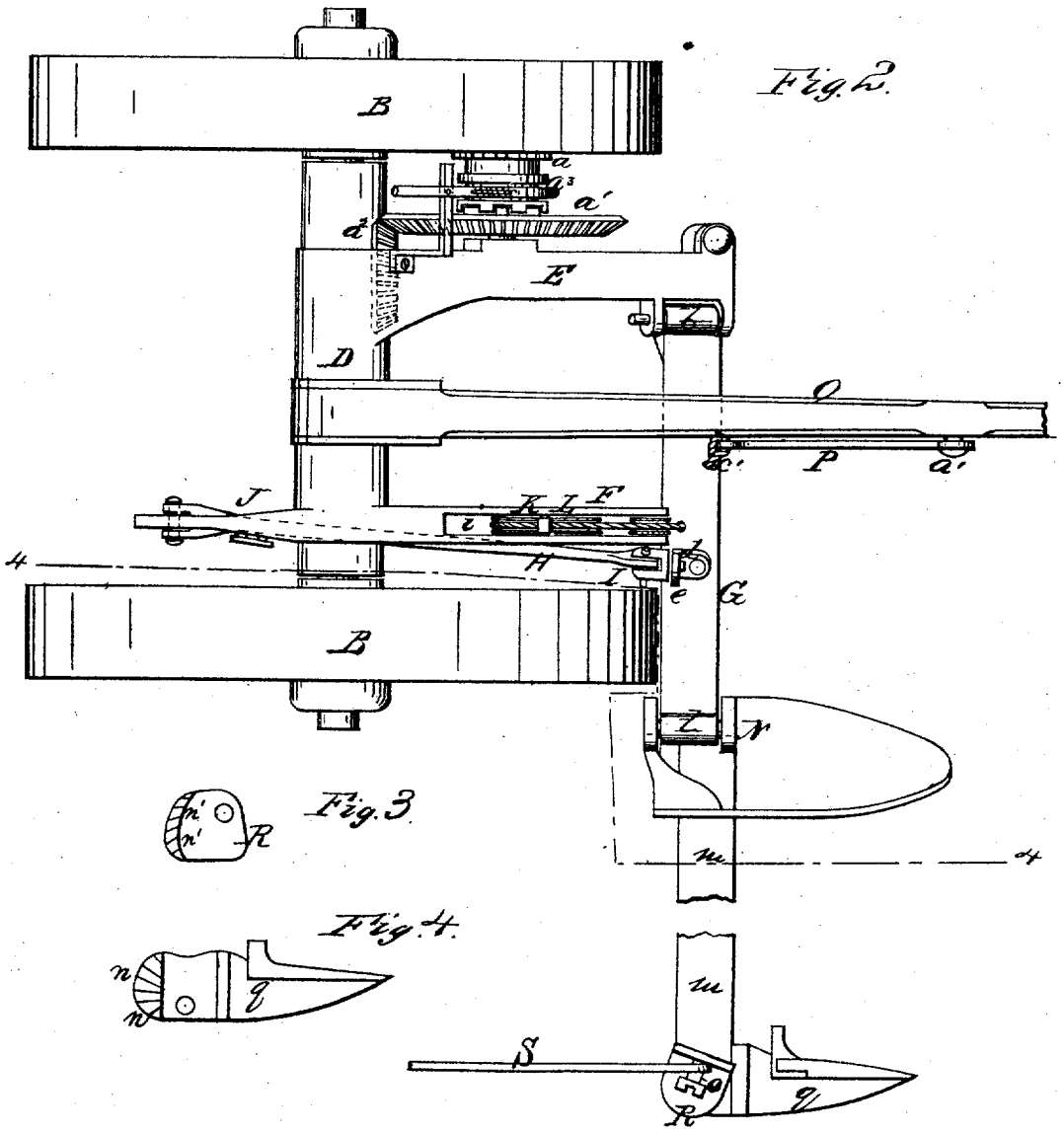
WITNESSES
Robert Everett.
Geo. E. Upham.
INVENTOR
James Pine
Chipman & Fowler
Attorneys
JAMES R. OSGOOD & CO. BOSTON.

3 Sheets—Sheet 3.

J. PINE.

MOWING-MACHINE.

No. 7,344. Reissued Oct. 10, 1876.

WITNESSES

Robert Everett

Geo. E. Upham.

INVENTOR

James Pine

Dufour and Spencer & Co

Attorneys

JAMES R. OSGOOD & CO. BOSTON.

UNITED STATES PATENT OFFICE.

JAMES PINE, OF TROY, NEW YORK.

IMPROVEMENT IN MOWING-MACHINES.

Specification forming part of Letters Patent No. 44,655, dated October 11, 1864; reissue No. 7,344, dated October 10, 1876; application filed July 3, 1874.

*To all whom it may concern:*

Be it known that I, JAMES PINE, of Troy, in the county of Rensselaer and State of New York, have invented certain new and useful Improvements in Mowing-Machines. I do hereby declare that the following is a full, clear, and exact description thereof, reference being had to the accompanying drawings, making part of this specification, in which—

Figure 1:
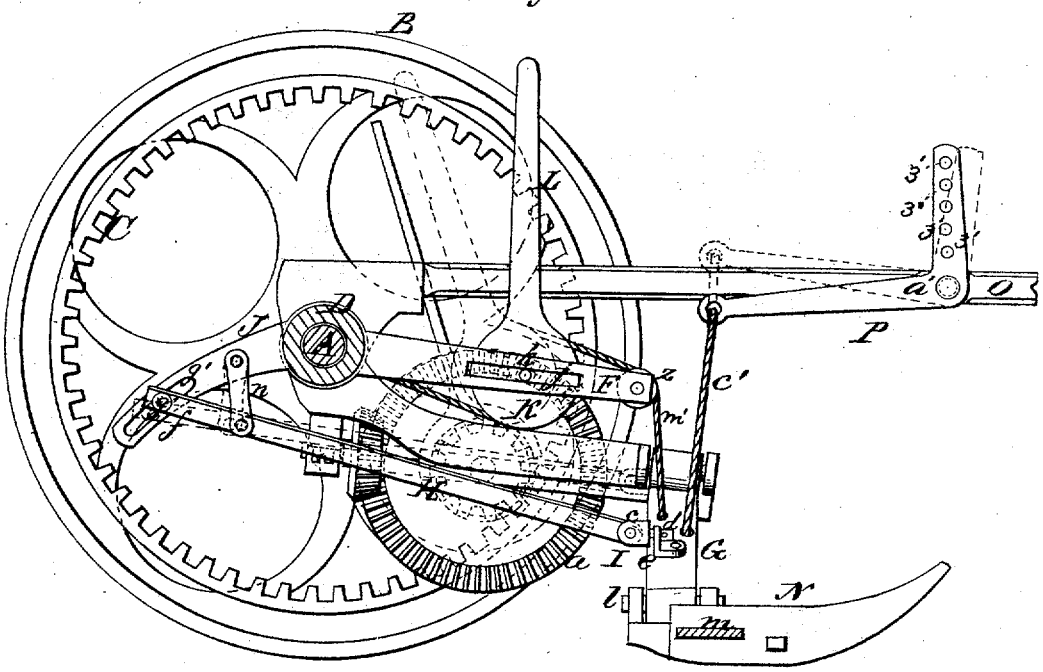
Figure 5:
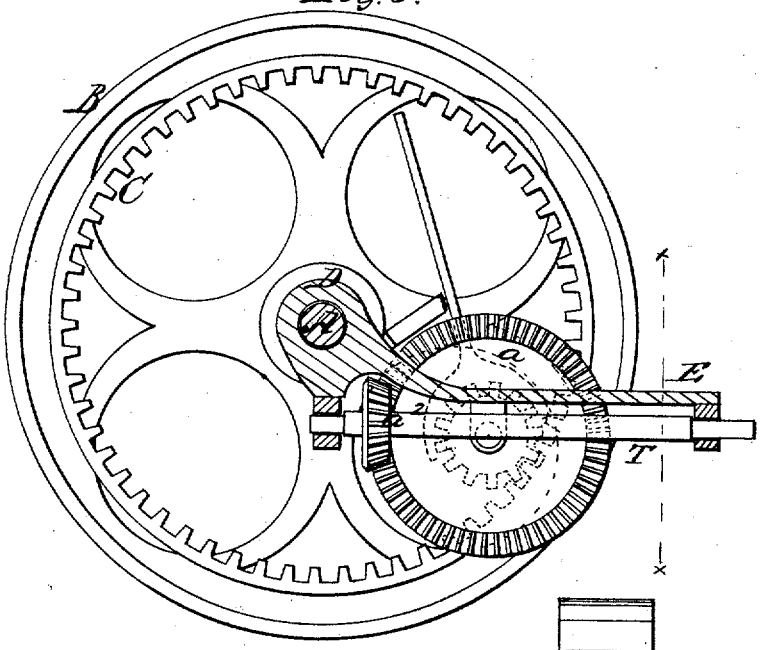
Figure 6:
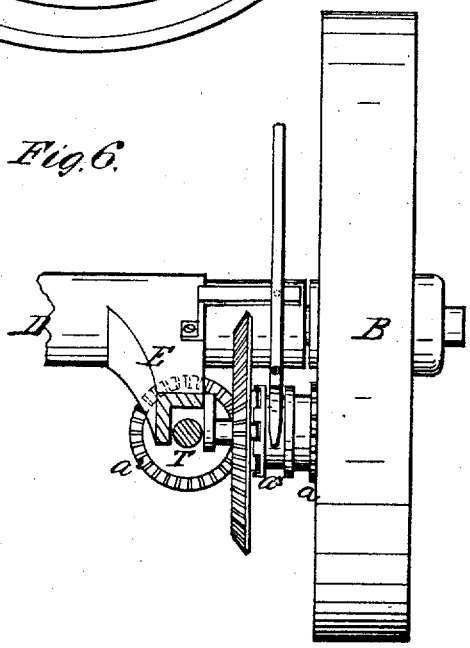

Figure 1 is a side sectional view of my machine, taken in the line 4 4, Fig. 2. Fig. 2 is a top view of the machine. Figs. 3 and 4 are views of the shoe and plate for adjusting the track-clearer. Figs. 5 and 6 are sectional details.

Similar letters of reference indicate corresponding parts in the several figures.

This invention relates to a new and useful improvement in adjusting or raising and lowering the finger-bar, and the parts connected therewith, to wit, the brace-rod and track-clearer. It also relates to an improved draft attachment for keeping the finger-bar free from the surface of the ground. Also, to an improved means for connecting the working parts with the axle of two transporting-wheels, which wheels are both driving-wheels, whereby nuts and bolts, and all their attending disadvantages, are avoided.

The main objects of my invention are to obtain a mowing-machine which will have a light draft, which can be economically manufactured, and which will admit of having its finger-bar raised and lowered vertically, and with but a limited movement of the lever employed for this purpose. Also, to obtain a track-clearer which can be adjusted so as to have a more or less oblique position to the line of draft, as circumstances may require; and, finally, to construct a gear or supporting frame in one piece, and to support and keep it in position on the axle by passing the latter through a hole or opening in said frame, all as will be hereinafter explained.

In the accompanying drawings, A designates the axle of the machine, on which axle two transporting or driving wheels, B B, are applied loosely, they being connected to the axle when moving forward by means of pawls and ratchets arranged in the usual way. To the axle A is firmly keyed a toothed wheel, C, from which motion is communicated to the sickle-driving mechanism through the medium of intermediate gearing. This gearing consists of wheels $a$ $a^1$ $a^2$. The wheels $a$ $a^1$ are applied to, and supported by, a short stud or pivot, on which they rotate, and are provided with a clutching device, $a^3$, actuated by a hand-lever. The wheel $a^2$ is keyed on a crank-shaft, T, which is at right angles to the axle A, and which is prevented from becoming entangled with grass by its being partially surrounded by the arm E of main frame, which arm E of main frame projects in front of axle A. This crank-shaft is designed for giving motion to the sickle. The arms E and F J constitute the sides of the frame, through which is a tube or opening or hole, through which the axle A passes, on and by which said gear-frame is supported and kept in position. The arms E and F J are connected by tube D, and are constructed or cast in one piece therewith, constituting the gear-frame of the machine, thus dispensing with the use of bolts and nuts. To the front end of the arm E of the gear-frame a bar, G, is connected by a joint, 3, and this bar G is braced by a rod, H, the end of which is attached to G by a swivel-joint, I, which is formed by a joint, $c$, connected by a swivel, $d$, to a plate, $e$, on G, as clearly shown in Figs. 1 and 2. The back end of the brace H is provided with a fork, $f$, through which a pin, $g$, passes, said fork receiving the curved arm J, which extends back from the sleeve D, and which has a curved slot, $g'$, through it for the pin $g$ to pass through. The back part of the brace H is also suspended from the arm or side J of the frame by means of a swinging pendant, $n$. (Shown clearly in Fig. 1.) The arm F is in line with the arm J, and constitutes one side of the gear-frame, and the arm F has a vertical slot, $i$, longitudinally through it, and it also has a longitudinal horizontal slot, $j$, through it. In the vertical slot $i$ a wheel or pulley, K, is fitted, its axis $k$ being in the horizontal slot $j$. This wheel or pulley has a lever, L, attached to it, and extending upward any suitable height. At the front end of side F J of gear-frame is a small pulley, 2, having grooved periphery, which pulley rotates on its axis vertically in a slot in said side of frame.

To the pulley K on the under side at the periphery which is grooved is attached a cord or chain, which is also attached in rear of said pulley K to the arm F J. A cord or chain is also connected with pulley K at its periphery at the upper side, and extends from thence, passing over small pulley 2, and connects with bar G. The finger-bar M is connected with bar G by means of joint *l*. Said finger-bar is provided with a shoe, N, near the joint *l*, said shoe constituting a part of said joint *l*. From the above description it will be seen that by a limited movement of the lever L, the bar G and finger-bar M will be raised, for the reason that the wheel or pulley K, to which the said lever is attached, has two motions, to wit: a rotary one and a sliding one, the latter being obtained in consequence of the axis *k* sliding in the horizontal slot *j*. This limited movement greatly facilitates the raising and lowering of the finger-bar, and it will be seen that, in consequence of the brace-rod H being attached to the bar G and arm J, as shown, the bar G and finger-bar M are allowed to rise and descend in a vertical plane, and, consequently, with but little friction, and without subjecting either the rod H or bar G to any unnecessary friction, the rod H being allowed a certain amount of longitudinal play on account of its back end working in the curved slot *g'* in the arm J, and the swivel-joint I forming a flexible connection between the rod H and bar G. The side E of the gear-frame, and the bar G attached to the front end thereof at right angles, and the rod H attached to the bar G at, or nearly at, right angles therewith, constitute a second or under frame that supports and keeps in position the finger-bar M. O is the draft-pole, which is attached directly to the tube D. P designates a draft-lever of a right angular form, and attached to the draft-pole O by a fulcrum-pin, $a^1$, the upper part or arm of which projects above the draft-pole O, and is perforated with a series of holes, 3', in any one of which the hook of a double-tree is applied. The lower arm of the lever P is connected by a cord or chain, *c'*, to the bar G. By this arrangement the draft is made subservient in keeping the finger-bar M slightly elevated, so that it will run freely and lightly over the surface of the ground, and the force of the pull on said lever P may be varied, so far as the force thereof is conveyed to the bar G, by connecting the double-tree higher or lower to the arm of the same extending above the draft-pole O. To the outer end of the finger-bar M a shoe, *q*, is attached, which may be of the usual or any proper form, and which is provided, at its back end, with a series of teeth, *n*, with which similar teeth *n'* on the under side of a plate, R, engage, said plate being on the upper surface of the finger-bar, and both the plate and the shoe being secured to it by a screw, *o*. To the plate R a track-clearer, S, is attached, of the usual form, and it will be seen that by loosening the screw *o* the plate R may be turned to give the track-clearer more or less of an oblique position, and that the teeth *n n'* will, when the screw *o* is set up, hold the said plate and track-clearer firmly in place. This track-clearer is adjustable according to the state or condition of the crop of grass, so that, whether the latter be heavy or light, a free track will always be obtained for the inside shoe of the machine to pass along in the subsequent swath.

Having described my invention, what I claim as new is—

1. The combination of the lifting-lever with the pulley, having a sliding axis, and the finger-bar, substantially as set forth.

2. Brace H, with its rear end attached to, and moving in, the curved slot at the rear end of arm F J, in combination with said arm and with the supporting-pendant pivoted at one end to the frame, and at the other end to the brace, the front end of said brace being connected with the coupling-bar or bar G, as set forth.

3. The combination of coupling-bar G, connected to, and vibrating on, the gear-frame, and the flexible connection between said coupling-bar and the whiffletree, as described.

4. The track-clearer S, applied to the outer end of the finger-bar, and made adjustable by means of teeth at the heel of the ear, to which the track-clearer is attached, adapted to mesh into corresponding teeth at the heel of the shoe, and a suitable clamp-pin device, as described.

5. The combination, in a draft or gear frame of a mowing-machine or harvester, of the sides E and F J, and tube D, through which the axle A passes, all constructed as described.

6. The combination of the gear and cutting apparatus supporting-frame, composed of one piece extending in front and rear of the axle, and supported and kept in position by the axle passing through the tube, or through a hole or opening through said frame, and the gearing and shafting to operate the cutting apparatus secured to, and supported by, said frame and axle between the two driving-wheels, and the cutting apparatus connected to said frame within or between the planes of said driving-wheels, substantially as and for the purpose set forth.

7. The frame of a mowing-machine or harvester, composed of one piece, mounted upon, and supported by, the axle, as set forth, and having one side or arm hollow or dished, by which the crank-shaft to operate the cutting apparatus is saddled, substantially as described.

In testimony that I claim the above I have hereunto subscribed my name in the presence of two witnesses.

JAMES PINE.

Witnesses:

DANIEL HUDSON,
CHARLES D. HUDSON.